(12) United States Patent
Fu et al.

(10) Patent No.: US 11,391,839 B2
(45) Date of Patent: Jul. 19, 2022

(54) RANGING AND SIGHTING DEVICE HAVING COMMON OPTICAL PATH WITH LASER SEPARATED IN FRONT OF IMAGING LENS

(71) Applicant: Shenzhen Ruierxing Electronic Co., Ltd., Guangdong (CN)

(72) Inventors: Luxin Fu, Guangdong (CN); Zhicheng Xing, Guangdong (CN)

(73) Assignee: SHENZHEN RUIERXING ELECTRONIC CO., LTD., Shenzhen (CN)

( * ) Notice: Subject to any disclaimer, the term of this patent is extended or adjusted under 35 U.S.C. 154(b) by 449 days.

(21) Appl. No.: 16/432,925

(22) Filed: Jun. 6, 2019

(65) Prior Publication Data

US 2019/0324140 A1    Oct. 24, 2019

Related U.S. Application Data

(63) Continuation of application No. PCT/CN2018/083530, filed on Apr. 18, 2018.

(51) Int. Cl.
*G01C 3/08*    (2006.01)
*G01S 17/06*   (2006.01)
*G01S 7/481*   (2006.01)

(52) U.S. Cl.
CPC .............. *G01S 17/06* (2013.01); *G01S 7/481* (2013.01)

(58) Field of Classification Search
None
See application file for complete search history.

(56) References Cited

FOREIGN PATENT DOCUMENTS

| EP | 3306343 B1 | * | 5/2021 | ............... G01S 7/51 |
| WO | WO 9711399 A1 | * | 3/1997 | ............... F41G 3/06 |
| WO | WO 2014130128 A2 | * | 8/2014 | ............... F41G 1/38 |

* cited by examiner

*Primary Examiner* — Mark Hellner

(57) ABSTRACT

A ranging and sighting device having common optical path with laser separated in front of imaging includes a housing, a control module, a laser transmitter, a laser receiver, a data display, a laser-reflection natural-light-transmission lens, a concave imaging lens and a red-light-reflection natural-light-transmission lens. A viewing hole of the housing, the laser-reflection natural-light-transmission lens, the concave imaging lens, the red-light-reflection natural-light-transmission lens and an observation hole of the housing (10) are linearly arranged in sequence to form a natural light observation path. Laser light transmitted from the laser transmitter illuminates an object to be observed after being reflected by the laser-reflection natural-light-transmission lens. The reflected laser light is reflected by the laser-reflection natural-light-transmission lens to the laser receiver. A laser light path of the laser light transmitted from the laser transmitter after being reflected by the laser-reflection natural-light-transmission lens is coaxial with the natural light observation path.

12 Claims, 10 Drawing Sheets

RANGING AND SIGHTING DEVICE HAVING COMMON OPTICAL PATH WITH LASER SEPARATED IN FRONT OF IMAGING LENS

TECHNICAL FIELD

The present invention relates to the technical field of ranging and sighting devices, and particularly to a ranging and sighting device having common optical path with laser separated in front of an imaging lens.

BACKGROUND

In typical laser ranging and sighting devices, a ranging and sighting device with common optical path is a relatively high-end product characterized by mixing laser transmitting, laser receiving and imaging light paths together. Such a product is simple and reliable in structure and excellent in integrity.

However, separating the laser transmitting, laser receiving and imaging natural light paths of such products is performed at the rear end of an imaging objective (a direction of the product close to an object to be observed and ranged is referred as a front end). Such a structure causes the laser light transmitted from a transmitting terminal form refracted light and reflected light within an optical path at the rear end of the imaging objective while exiting through the imaging objective, the refracted light and reflected light will reach a receiver through an internal optical path prior to reflected light actually for ranging, which forms a short-distance high-intensity signal, causing a large short-distance blind zone, and resulting in failure of performing short-distance ranging within 12 meters.

SUMMARY objective of the present invention is to provide a ranging and sighting device having common optical path with laser separated in front of an imaging lens, which aims to solve the problem of large short-distance blind zone of a ranging and sighting device with common optical path in the prior art due to separating laser reflecting, laser receiving and imaging natural light paths at the rear end of an imaging objective, and may shorten the nearest ranging distance to 1 meter.

In order to solve the above technical problem, a technical solution of the present invention is to provide a ranging and sighting device having common optical path with laser separated in front of an imaging lens, including a housing, a control module, a laser transmitter, a laser receiver, a data display, a laser-reflection natural-light-transmission mirror, a concave imaging lens and a red-light-reflection natural-light-transmission mirror, wherein the housing is provided with an viewing hole and an observation hole; the housing defines a mounting cavity the control module, the laser transmitter, the laser receiver, the data display, the laser-reflection natural-light-transmission mirror, the concave imaging lens and the red-light-reflection natural-light-transmission mirror are all mounted within the mounting cavity; the viewing hole, the laser-reflection natural-light-transmission mirror, the concave imaging lens, the red-light-reflection natural-light-transmission mirror and the observation hole are linearly arranged in sequence in order to form a natural light observation path; the laser transmitter, the laser receiver and the data display are electrically connected with the control module; the data display emits red light for displaying; laser light transmitted from the laser transmitter illuminates an object to be observed after being reflected by the laser-reflection natural-light-transmission mirror; the laser light reflected by the object to be observed is received by the laser receiver after being reflected by the laser-reflection natural-light-transmission mirror; the red light transmitted from the data display is reflected by the red-light-reflection natural-light-transmission mirror and imaged on the concave imaging lens; a laser light path of the laser light transmitted from the laser transmitter after being reflected by the laser-reflection natural-light-transmission mirror and a laser light path of the laser reflected by the object to be observed before being reflected by the laser-reflection natural-light-transmission mirror are coaxial with the natural light observation path. Since the laser is transmitted or received only by one laser-reflection natural-light-transmission mirror without passing through an imaging objective lens, there are no inner optical path with refraction and reflection, and the problem of large short-distance blind zone is avoided.

Further, the ranging and sighting device having common optical path with laser separated in front of an imaging lens further includes a laser reflecting mirror mounted within the mounting cavity, wherein the laser reflecting mirror is arranged opposite to the laser-reflection natural-light-transmission mirror, the laser light transmitted from the laser transmitter illuminates the object to be observed after being reflected by the laser reflecting mirror and then the laser-reflection natural-light-transmission mirror, and the laser light reflected by the object to be observed is received by the laser receiver after being reflected by the laser-reflection natural-light-transmission mirror and then the laser reflecting mirror.

Further, the ranging and sighting device having common optical path with laser separated in front of an imaging lens further includes a laser condensing lens mounted within the mounting cavity, wherein the laser condensing lens is arranged between the laser-reflection natural-light-transmission mirror and the laser reflecting mirror.

Further, the concave imaging lens allows visible light to pass through, an inner concave surface of the concave imaging lens is capable of reflecting red light, and the concave imaging lens images the object to be observed by 1:1 after the natural light reflected by the object passes through the concave imaging lens along the natural light observation path.

Further, the data display emits reference point red light, which is reflected by the red-light-reflection natural-light-transmission mirror and imaged as a reference red point at a center point of the concave lens, and an observation axis of the natural light observation path passes through the reference red point.

Further, the ranging and sighting device having common optical path with laser separated in front of an imaging lens further includes a built-in optical path mounting bracket mounted within the mounting cavity, wherein the laser transmitter, the laser receiver, the data display, the laser-reflection natural-light-transmission mirror, the concave imaging lens, the red-light-reflection natural-light-transmission mirror, the laser reflecting mirror and the laser condensing lens are fixedly mounted on the built-in optical path mounting bracket, wherein the laser transmitter, the laser reflecting mirror, the laser condensing lens and the laser-reflection natural-light-transmission mirror form an independent laser transmitting path within the built-in optical path mounting bracket; the laser-reflection natural-light-transmission mirror, the laser condensing lens, the laser reflecting mirror and the laser receiver form an independent laser receiving path within the built-in optical path mounting bracket; the data display, the red-light-reflection natural-light-transmission mirror and the concave imaging lens form an independent data imaging path within the built-in optical path mounting bracket; and the laser-reflection natural-light-transmission mirror, the concave imaging lens and the red-light-reflection natural-light-transmission mirror form an independent natural light observation path within the built-in optical path mounting bracket.

Further, a first end of the built-in optical path mounting bracket is hinged on the housing, and a lifting adjustment mechanism is disposed between a second end of the built-in optical path mounting bracket and the housing.

Further, the lifting adjustment mechanism includes an adjusting worm, an adjusting worm wheel and a mating screw, wherein the adjusting worm and the adjusting worm wheel are meshed with each other and both mounted on the housing, a first end of the mating screw is fixedly connected with the built-in optical path mounting bracket, and a second end of the mating screw is threaded with the adjusting worm wheel.

Further, a limiting leaf spring is provided on the second end of the built-in optical path mounting bracket and pre-compressed between the second end of the built-in optical path mounting bracket and the housing, and the built-in optical path mounting bracket is positioned between the lifting adjustment mechanism and the limiting leaf spring.

Further, a horizontally adjusting means is disposed between the second end of the built-in optical path mounting bracket and the housing.

Further, the ranging and sighting device having common optical path with laser separated in front of an imaging lens further includes a first waterproof glass and a second waterproof glass, wherein the first waterproof glass is mounted on the viewing hole, and the second waterproof glass is mounted on the observation hole.

Further, the housing is provided with a mounting groove in an outer side for being fitted with an assembling sliding rail of an external equipment.

In the present invention, for laser transmitting and laser receiving, the laser light does not propagate towards the rear end of the laser-reflection natural-light-transmission mirror any more after being separated from the natural light by the laser-reflection natural-light-transmission mirror, and not enter a visual sighting path through the imaging lens. By virtue of a well set reflection angle, no interference exists between laser transmitting and receiving paths, a short-distance blind zone (with the closest range-finding distance of 1 meter) of the ranging and sighting device with a common path is greatly reduced, and the problems of large limitation in closest range-finding and larger blind zone (with the closest range-finding distance of 12 meters) due to refraction and reflection of the internal optical path at the rear end of the imaging objective of the typical ranging and sighting device with a common path after the laser transmitting path passes through the imaging objective are perfectly solved.

Reference Numerals in the Drawings

Figure 1:
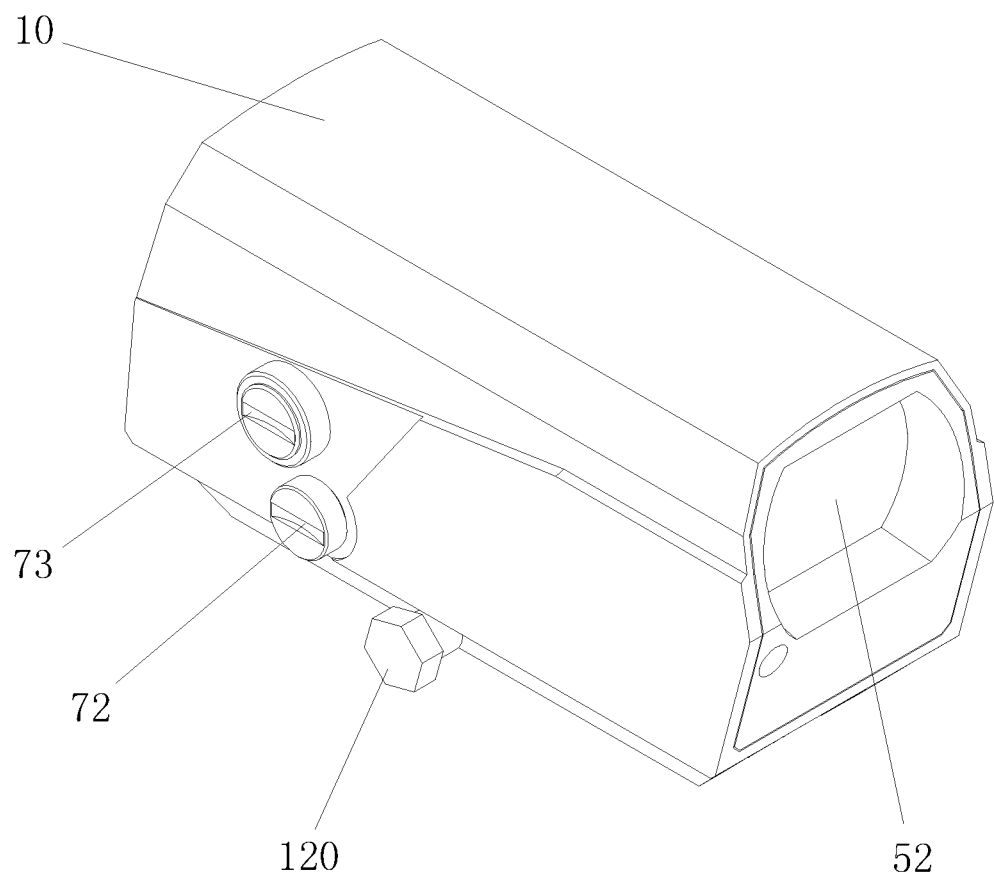
FIG. 1 is a schematic perspective view of an assembled ranging and sighting device having common optical path with laser separated in front of an imaging lens according to an embodiment of the present invention.

10 housing; 11, mounting cavity; 12, assembling slot; 120, locking bolt; 20, control module; 31, laser transmitter; 32, laser receiver; 33, data display; 41, laser-reflection natural-light-transmission mirror; 42, concave imaging lens; 43, red-light-reflection natural-light-transmission mirror; 44, laser reflecting mirror; 45, laser condensing lens; 451, laser-transmission condensing lens; 452, laser-reception condensing lens; 51, first waterproof glass; 52, second waterproof glass; 60, built-in optical path mounting bracket; 71, lifting adjustment means; 711, adjusting worm; 712, adjusting worm wheel; 713, mating screw; 72, limiting leaf spring; 73, horizontally adjusting means; 731, abutting adjustment screw; 732, compression spring; 733, abutting block; 81, power battery; and 100, reference red point.

DESCRIPTION OF THE EMBODIMENTS

In order to make the objective, technical solutions and advantages of the present invention more apparent, the present invention will be further described in detail below with reference to accompanying drawings and embodiments. It should be understood that the specific embodiments described herein are merely illustrative of the present invention and are not intended to limit the present invention.

It is to be noted that when one element is referred to as being "fixed on" or "arranged on" the other element, it may be on the other element directly or indirectly. When one element is referred to as being "connected to" the other element, it may be connected to the other element directly or indirectly.

It is also to be noted that orientation terms such as left, right, upper and lower in this embodiment are merely relative to one another or take a normal use state of a product as a reference, and should not be considered as limiting to the invention.

As shown in FIGS. 1 to 10, a ranging and sighting device having common optical path with laser separated in front of an imaging lens in this embodiment includes a housing 10, a control module 20, a laser transmitter 31, a laser receiver 32, a data display 33, a laser-reflection natural-light-transmission mirror 41, a concave imaging lens 42 and a red-light-reflection natural-light-transmission mirror 43. The housing 10 is provided with a viewing hole and an observation hole. The housing 10 is formed with a mounting cavity 11, in which the control module 20, the laser transmitter 31, the laser receiver 32, the data display 33, the laser-reflection natural-light-transmission mirror 41, the concave imaging lens 42 and the red-light-reflection natural-light-transmission mirror 43 are all mounted. Moreover, the viewing hole, the laser-reflection natural-light-transmission mirror 41, the concave imaging lens 42, the red-light-reflection natural-light-transmission mirror 43 and the observation hole are arranged linearly in sequence to form a natural light observation path. The laser transmitter 31, the laser receiver 32 and the data display 33 are electrically connected with the control module 20. Laser light transmitted from the laser transmitter 31 illuminates an object to be observed after being reflected by the laser-reflection natural-light-transmission mirror 41. The laser light reflected by the object to be observed is received by the laser receiver 32 after being reflected by the laser-reflection natural-light-transmission mirror 41. The data display 33 transmits red light for displaying it. The red light transmitted from the data display 33 is reflected by the red-light-reflection natural-light-transmission mirror 43 and imaged on the concave imaging lens 42. A laser light path of the laser light transmitted from the laser transmitter 31 after being reflected by the laser-reflection natural-light-transmission mirror 41 is coaxial with the natural light observation path.

When the ranging and sighting device having common optical path with laser separated in front of an imaging lens of this embodiment is in use for ranging and sighting, the laser light transmitted from the laser transmitter 31 directly illuminates the object to be observed after being reflected by the laser-reflection natural-light-transmission mirror 41, without any need of passing through superfluous lenses to form an optical path for illuminating the object to be observed. Then, the laser light is reflected by the object to be observed, and then received by the laser receiver 32 after being reflected by the laser-reflection natural-light-transmission mirror 41 again. Similarly, without passing through superfluous lenses to be received. Accordingly, the propagation efficiency of the laser light is maintained so as to make the received laser light relatively efficient. Further, in the ranging and sighting device having common optical path with laser separated in front of an imaging lens, natural light is directly observed by a user after passing through the laser-reflection natural-light-transmission mirror 41, the concave imaging lens 42, and the red-light-reflection natural-light-transmission mirror 43 when the user visually observes the object to be observed by means of the natural light. Compared with the typical ranging and sighting devices in the prior art, the ranging and sighting device having common optical path with laser separated in front of an imaging lens eliminates the problem of large blind zone of short-distance ranging due to refraction or reflection in the internal optical path as light rays of the natural light observation path do not need to pass through a beam splitter prism, lens, and the like, and ensures that a receiving path is isolated from a transmitting path because the transmitted laser light or the laser light reflected from the object to be observed is completely reflected by the laser-reflection natural-light-transmission mirror 41 to the laser receiver 32. Moreover, data of the data display 33 is imaged onto the concave imaging lens 42 after being reflected by the red-light-reflection natural-light-transmission mirror 43, such that the user can easily and quickly compare the observed object with the displayed data reference. A simple and accurate comparison process is performed on this basis, which allows the transmitted laser and the observed natural light to remain coaxial in an observation process, so as to prevent the laser light from being deviating from a visual center. In the ranging and sighting device having common optical path with laser separated in front of an imaging lens, the transmitted laser light and the observing natural light illuminate the object to be observed after coaxially converging together at the laser-reflection natural-light-transmission mirror 41. Furthermore, the user visually compares the data reference with the observed object in the observation process, increasing the accuracy of observation and ranging.

As shown in FIGS. 7 to 10, in order to make the ranging and sighting device having common optical path with laser separated in front of an imaging lens more compact, a mounting volume of the mounting cavity 11 of a housing 10 is reasonably considered and arranged, so that the parts are reasonably assembled and arranged within the mounting cavity 11. Moreover, in this embodiment, the ranging and sighting device having common optical path with laser separated in front of an imaging lens further includes a laser reflecting mirror 44 mounted within the mounting cavity 11. The laser reflecting mirror 44 is arranged opposite to the laser-reflection natural-light-transmission mirror 41. Laser light transmitted from the laser transmitter 31 illuminates the object to be observed after being reflected by the laser reflecting mirror 44 and then the laser-reflection natural-light-transmission mirror 41, which may enable the laser transmitter 31 to be mounted and arranged in parallel with the natural light observation path, such that a transmitting direction of the laser light is parallel to a natural light propagation direction during visual observation. Moreover, the laser light reflected by the object to be observed is received by the laser receiver 32 after being reflected by the laser-reflection natural-light-transmission mirror 41 and then by the laser reflecting mirror 44. In this way, the arrangement of the components such as the laser transmitter 31 and the laser receiver 32 within the mounting cavity 11 may be designed more reasonably, so that a compact design of the ranging and sighting device having common optical path with laser separated in front of an imaging lens is realized.

Figure 5:
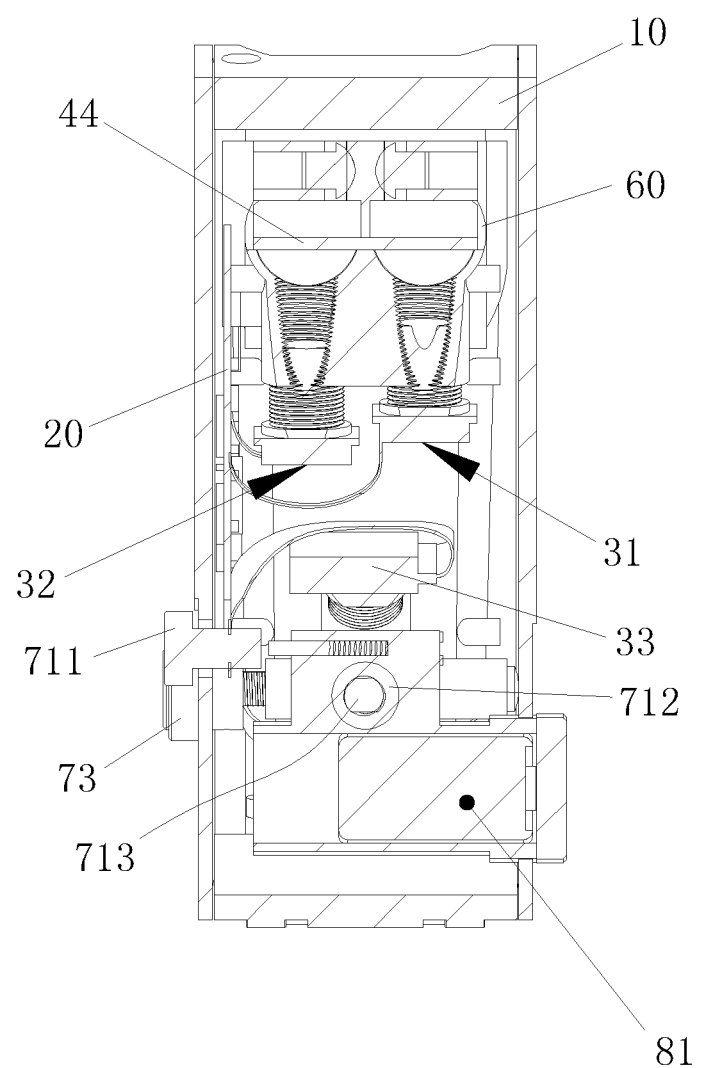
FIG. 5 is a cross-sectional view of FIG. 2, taken along a line B-B.
Figure 6:
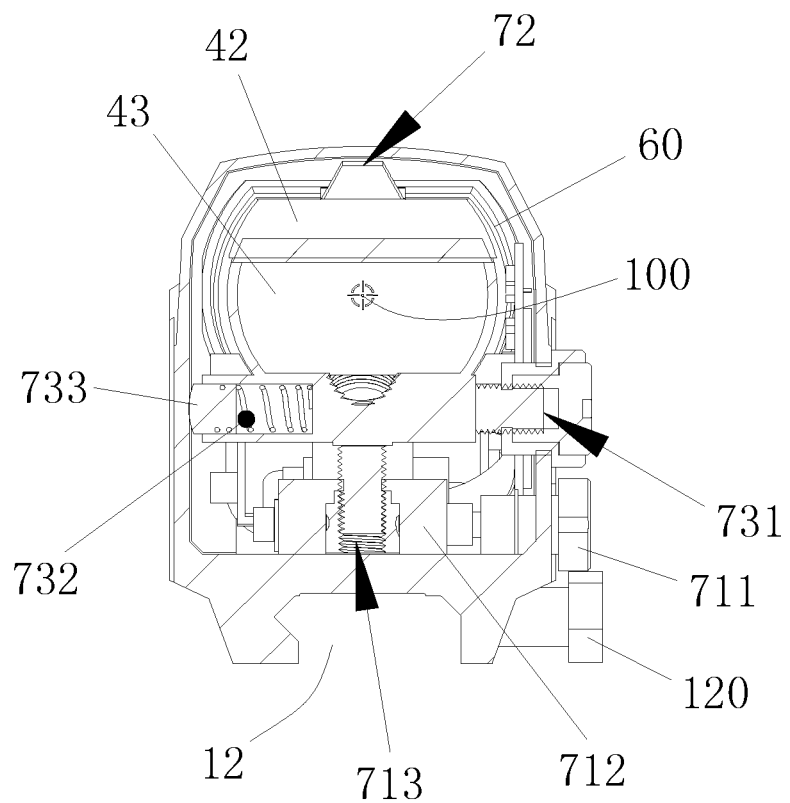
FIG. 6 is a cross-sectional view of FIG. 3, taken along a line C-C.

In addition, in optimizing a mounting position of the mounting cavity 11, as shown in FIG. 5, a power battery 81 is installed in the mounting cavity 11 without interfering the remaining components installed within the mounting cavity 11, The power battery is connected with the control module 20 to achieve power supply.

The control module 20 in the ranging and sighting device having common optical path with laser separated in front of an imaging lens uses an integrated circuit board, in which respective control circuit units are designed corresponding to respective application functions. For example, for a laser ranging function, a calculation control unit is designed, which may be assembled by adopting a central processing chip (a MCU, a PLC, and the like). In fact, the integrated circuit board used by the control module 20 is known in the art, and thus it will not be described in detail here.

Preferably, the ranging and sighting device having common optical path with laser separated in front of an imaging lens of this embodiment is not only applicable to perform ranging and sighting under a well-lighted environment, but also applicable to perform ranging and sighting under a badly-lighted environment. For this purpose, a light-energy adjusting circuit unit is provided in the control module 20, and the adjustment can be performed by a corresponding adjusting button. When the environmental light is sufficient, the user may visually observe the object to be observed clearly, and thus the laser transmitting path and the laser reflecting path are better in transmitting efficiency. The light energy of the laser light may be turned down by the adjusting button, or otherwise the light energy of the laser light will be turned up when the environment light is insufficient. In addition, an ambient temperature sensor is further provided on the ranging and sighting device having common optical path with laser separated in front of an imaging lens, thereby detecting a temperature of an environment where it is located and displaying it through the data display 33. In this regard, a display mode conversion circuit unit is provided on the integrated circuit board. A display mode can be switched by a mode switching button, as a result, the display information of the data display 33 can be switched between ranging data and temperature data by the mode switching button, so as to be imaged and displayed on the concave imaging lens 42.

In this embodiment, in order to enable the laser light transmitted from the laser transmitter 31 to more intensively illuminate the object to be observed and to further enable the laser light reflected from the object to be observed to be more intensively received by the laser receiver 32, the ranging and sighting device having common optical path with laser separated in front of an imaging lens of this embodiment further includes a laser condensing lens 45 mounted within the mounting cavity 11, between the laser-reflection natural-light-transmission mirror 41 and the laser reflecting mirror 44. In this way, the laser transmitter 31 transmits the laser light, and after the laser light illuminates on the laser reflecting mirror 44, there is a certain extent of scattering in a reflection process of the laser reflecting mirror 44, in the meanwhile, the scattered laser light is condensed again by the laser condensing lens 45 to form intensive parallel laser light, which illuminates the object to be observed after being reflected by the laser-reflection natural-light-transmission mirror 41 again. As such, the laser light may intensively illuminate the object to be observed after being reflected twice. When the laser light illuminates the object to be observed, and after the laser light is reflected by the scene to be observed, there is a certain divergence in the laser light reflected by the object to be observed. Similarly, after being condensed by the laser condensing lens 45, the diverged laser light reflected by the object to be observed may be reflected by the laser reflecting mirror 44 to the laser receiver 32 for being received. As such, it is possible to ensure that laser-transmission propagating laser light and laser-reception propagating laser light are well isolated without interference to one another, thereby avoiding the problem of short-range interference and achieving the purpose of inhibiting the short-distance blind zone. Moreover, the laser transmitting path and the laser receiving path are absolutely physically isolated before passing through the laser condensing lens without interference. After passing through the laser condensing lens, the laser light illuminates the object to be observed after being reflected by the only laser-reflection natural-light-transmission mirror.

In order to achieve a modular assembly process in manufacturing and assembling processes for facilitating the manufacturing and assembling, the ranging and sighting device having common optical path with laser separated in front of an imaging lens further includes a built-in optical path mounting bracket 60 provided within the mounting cavity 11. The laser transmitter 31, the laser receiver 32, the data display 33, the laser-reflection natural-light-transmission mirror 41, the concave imaging lens 42, the red-light-reflection natural-light-transmission mirror 43, the laser reflecting mirror 44 and the laser condensing lens 45 are all fixedly mounted on the built-in optical path mounting bracket 60. The laser transmitter 31, the laser reflecting mirror 44, the laser condensing lens 45 and the laser-reflection natural-light-transmission mirror 41 form an independent laser transmitting path within the built-in optical path mounting bracket 60. The laser-reflection natural-light-transmission mirror 41, the laser condensing lens 45, the laser reflecting mirror 44 and the laser receiver 32 form an independent laser receiving path within the built-in optical path mounting bracket 60 (a laser path of the laser light reflected by the object to be observed before being reflected by the laser-reflection natural-light-transmission mirror 41 is coaxial with the natural light observation path). The data display 33, the red-light-reflection natural-light-transmission mirror 43 and the concave imaging lens 42 form an independent data imaging path within the built-in optical path mounting bracket 60. The laser-reflection natural-light-transmission mirror 41, the concave imaging lens 42 and the red-light-reflection natural-light-transmission mirror 43 form an independent natural light observation path within the built-in optical path mounting bracket 60.

Specifically, the concave imaging lens 42 in this embodiment is a concave lens, and the concave imaging lens 42 images the object by 1:1 after the natural light reflected by the object to be observed passes there through (at this time, an image of the object to be observed, which is observed visually by the user through the natural light observation path of the ranging and sighting device having common optical path with laser separated in front of an imaging lens, is the same as an image observed by the user normally visually). The data display 33 transmits reference point red light, which is reflected by the red-light-reflection natural-light-transmission mirror 43 and is imaged as a reference red point 100 at a center point of the concave imaging lens, and an observation axis of the natural light observation path passes through the reference red point 100 (the reference red point 100 formed by the data display 33 is always imaged and displayed on the concave imaging lens 42 in switching the display mode). During ranging and sighting, the user visually observes the object to be observed through the natural light observation path. At this time, the reference red point 100 transmitted from the activated data display 33 is imaged and displayed on the concave imaging lens 42, and the user only needs to make the reference red point 100 just align with the object to be observed, so that coaxial calibration among the laser transmitting path, the laser reflecting path, the natural light observation path, the object to be observed, and eyes of the user can be realized.

Figure 2:
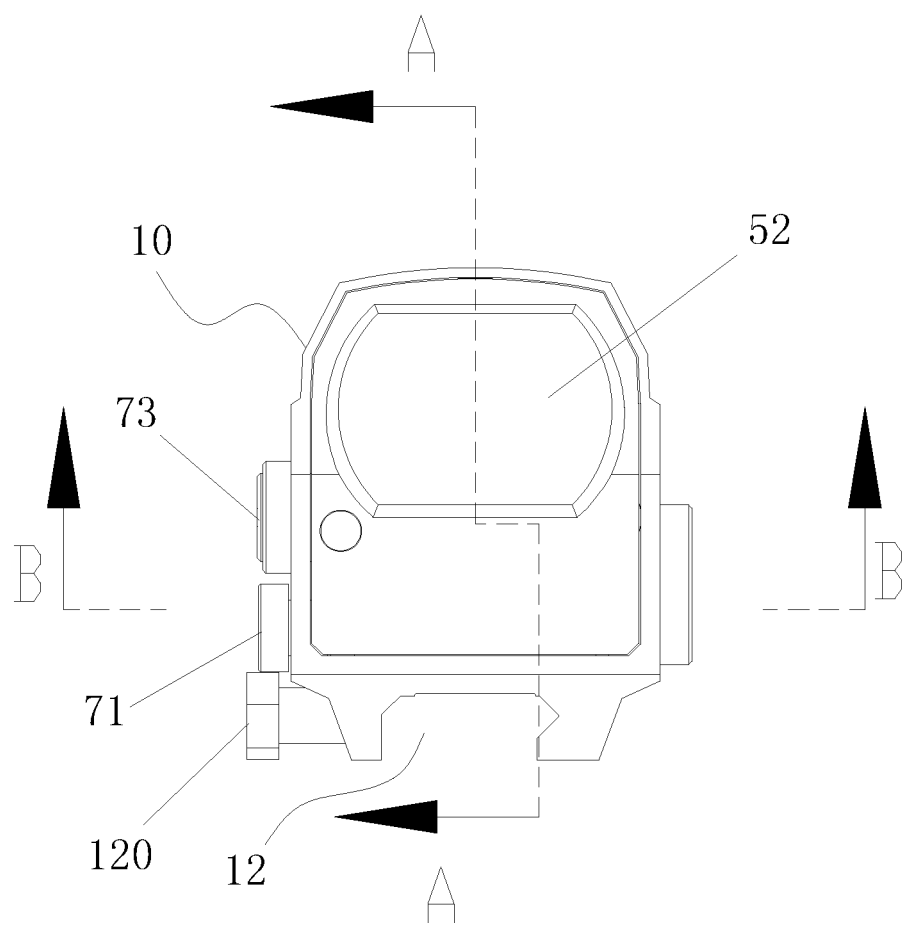
FIG. 2 is a front view of an assembled ranging and sighting device having common optical path with laser separated in front of an imaging lens according to embodiment of the present invention.
Figure 3:
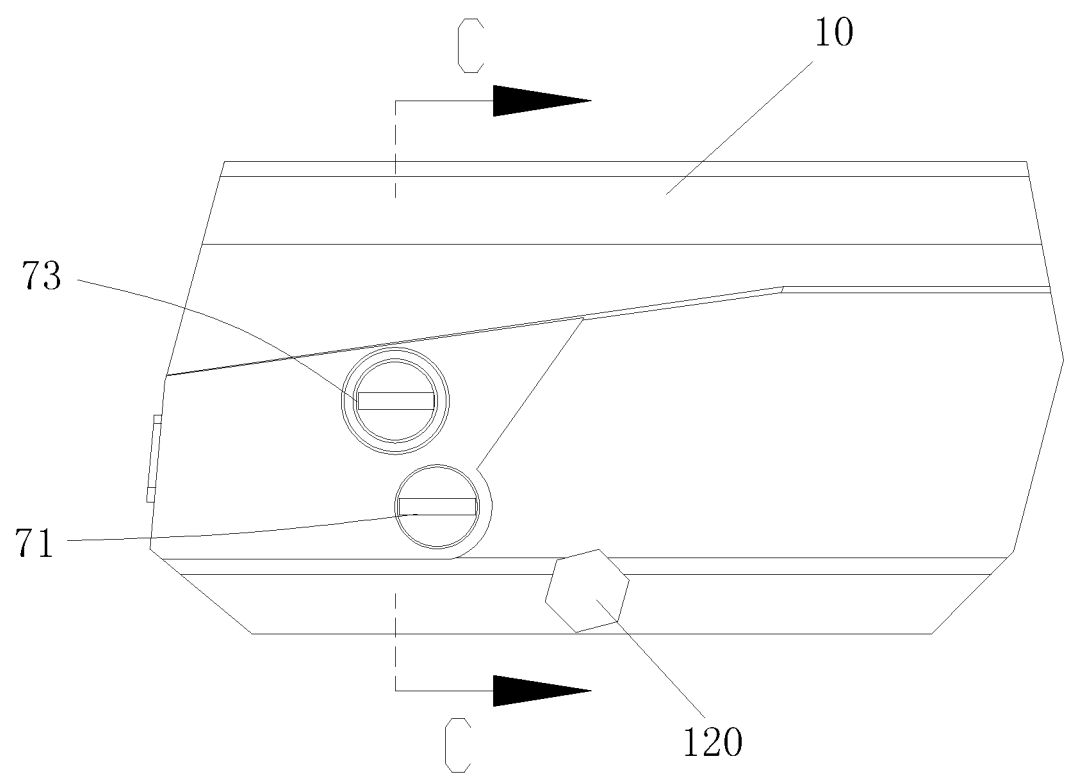
FIG. 3 is a left view of FIG. 2.
Figure 4:
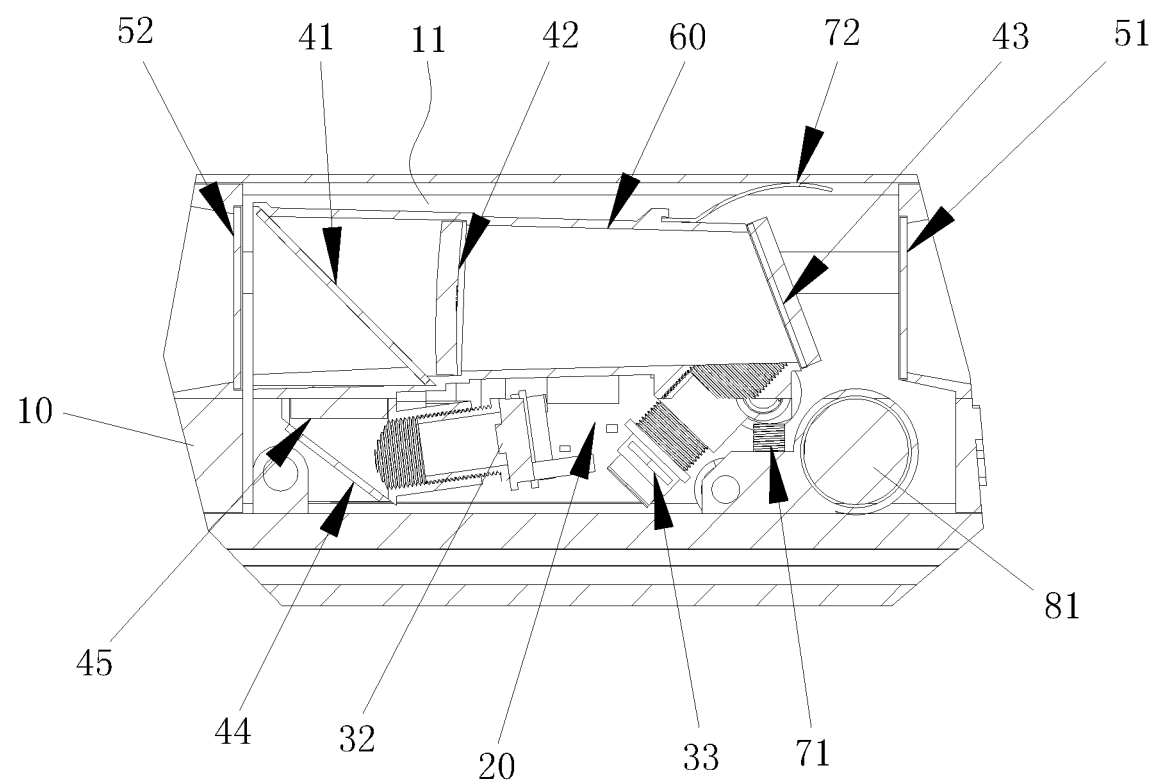
FIG. 4 is a cross-sectional view of FIG. 2, taken along a line A-A.

In this embodiment, a mounting groove 12 is provided in an outer side of the housing 10 and configured to fit with an assembling sliding rail of an external equipment. By means of the mounting groove 12, the user may easily and quickly mount the ranging and sighting device having common optical path with laser separated in front of an imaging lens, that is, using a corresponding matching mounting bracket having the assembling sliding rail matching with the mounting groove 12. As such, the user may mount the ranging and sighting device having common optical path with laser separated in front of an imaging lens only by aligning the mounting groove 12 with the assembling sliding rail, then making the mounting groove 12 engaged with the assembling sliding rail, and then locking with the assembling sliding rail by means of a locking screw 120 as shown in FIG. 1 to FIG. 3.

In a process of performing ranging and sighting by applying the ranging and sighting device having common optical path with laser separated in front of an imaging lens after it has been assembled and mounted, the user visually observes the object to be observed and performs reference calibration with the object to be observed by using the reference red point 100 imaged and displayed on the concave imaging lens 42. Since angle differences between the mounted ranging and sighting device having common optical path with laser separated in front of an imaging lens and different objects to be observed may cause a certain deviation with respect to the reference calibration between different objects to be observed and the reference red point 100, a first end of the built-in optical path mounting bracket 60 is hinged on the housing 10, and a lifting adjustment mechanism 71 is disposed between a second end of the built-in optical path mounting bracket 60 and the housing 10. Particularly, the lifting adjustment mechanism 71 includes an adjusting worm 711, an adjusting worm Wheel 712 and a mating screw 713. The adjusting worm 711 and the adjusting worm wheel 712 are meshed with each other and are both mounted on the housing 10. The mating screw 713 is fixedly connected with the built-in optical path mounting bracket 60 at a first end and engaged with the adjusting worm Wheel 712 at a second end. In this way, when the user visually observes the object to be observed and performs reference calibration with the object to be observed by using the reference red point 100, the user may rotate the adjusting worm 711, and the adjusting worm 711 drives the adjusting worm wheel 712 to rotate and then drives the mating screw 713 to move upwards or downwards, thereby driving the built-in optical path mounting bracket 60 to perform vertical angle adjustment with respect to the first end functioning as a pivot. Further, a horizontally adjusting means 73 is disposed between a second end of the built-in optical path mounting bracket 60 and the housing 10. Particularly, the horizontally adjusting means 73 includes an abutting adjusting screw 731, a compression spring 732 and an abutting block 733. The abutting adjusting screw 731 and the compression spring 732 are respectively arranged on opposite sides of the built-in optical path mounting bracket 60 (a horizontal adjusting plate extending from the built-in optical path mounting bracket 60 may be provided for allowing the abutting adjusting screw 731 and the compression spring 732 to be respectively mounted on opposite sides thereof), so that a first end of the compression spring 732 abuts against the built-in optical path mounting bracket 60. The abutting block 733 is arranged between the compression spring 732 and the housing 10, such that a second end of the compression spring 732 abuts against the abutting block 733 and urges the abutting block 733 to abut against the housing 10. When the user needs to perform horizontally angular adjustment, the user screws the abutting adjusting screw 731, the abutting adjusting screw 731 urges the built-in optical path mounting bracket 60 at an end portion, and then the built-in optical path mounting bracket 60 presses the compression spring. 732, so that the built-in optical path mounting bracket 60 is horizontally adjusted to the left with respect to its first end functioning as a fulcrum. Alternatively, when the user unscrews the abutting adjusting screw 731, the abutting adjusting screw 731 has a trend to move away from the built-in optical path mounting bracket 60. At this time, the compression spring 732 elongates and urges the built-in optical path mounting bracket 60, so that the built-in optical path mounting bracket 60 is horizontally adjusted to the right with respect to its first end.

Preferably, a limiting leaf spring 72 is provided on a second end of the built-in optical path mounting bracket 60 of the ranging and sighting device having common optical path with laser separated in front of an imaging lens. The limiting leaf spring 72 is mounted between the second end of the built-in optical path mounting bracket 60 and the housing 10 and pre-compressed there between. The built-in optical path mounting bracket 60 is positioned between the lifting adjusting mechanism 71 and the limiting leaf spring 72. In this way, during performing the vertical angle adjustment on the built-in optical path mounting bracket 60, the limiting leaf spring 72 is always pre-compressed between the built-in optical path mounting bracket 60 and the housing 10, so that the built-in optical path mounting bracket 60 is stabilized relative to the housing 10 to ensure that the built-in optical path mounting bracket 60 does not cause displacement and misalignment accidentally during vertical adjustment and horizontal adjustment, and thus the stability of the built-in optical path mounting bracket 60 is maintained.

As shown in FIG. 1, FIG. 2, FIG. 4, and FIG. 7 to FIG. 10, the ranging and sighting device having common optical path with laser separated in front of an imaging lens of this embodiment further includes a first waterproof glass 51 and a second waterproof glass 52. The first waterproof glass 51 is mounted on the viewing hole, and the second waterproof glass 52 is mounted on an observation hole. Sealed waterproofing is achieved by means of the first waterproof glass 51 and the second waterproof glass 52 mounted on the viewing hole and the observation hole of the housing 10. A sealed waterproof design is also employed to the adjusting worm 711 and the abutting adjusting screw 731 when they are designed and installed. In this way, when the product is used in the outdoor and rainy days, rainwater cannot enter the inside of the housing 10 to damage the control module 20, and the user can still perform the sighting and ranging operations on the object to be observed. In addition, the first waterproof glass 51 and the second waterproof glass 52 may also prevent dust and foreign matter from entering the installation cavity 11, so as to prevent the dust and the foreign matter from polluting the control module 20, the optical lens, and the like within the mounting cavity 11, and ensuring that the ranging and sighting device having common optical path with laser separated in front of an imaging lens is clean there inside.

Figure 7:
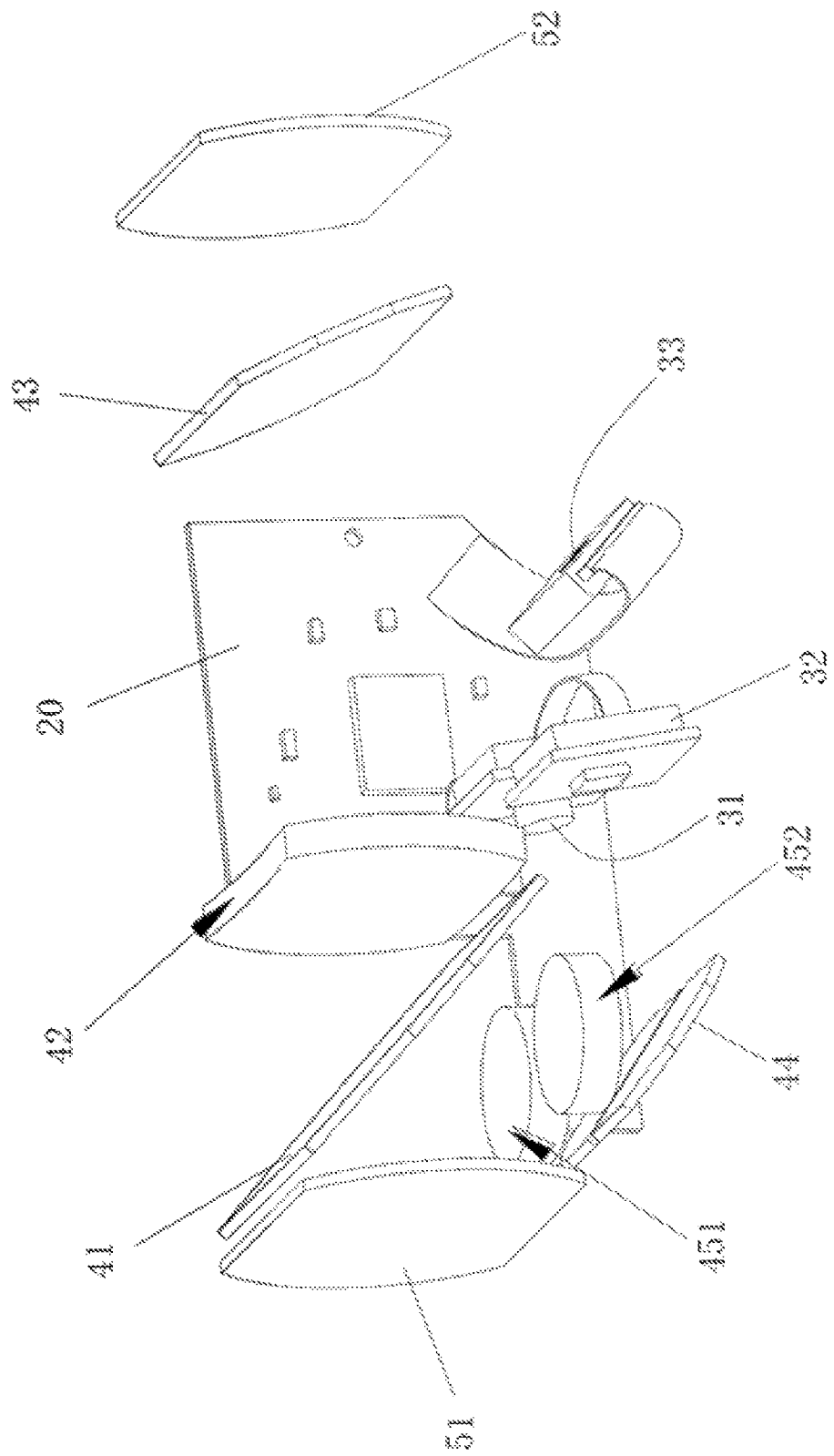
FIG. 7 is a schematic diagram showing an arrangement of optical members in a ranging and sighting device having common optical path with laser separated in front of an imaging lens according to an embodiment of the present invention.
Figure 8:
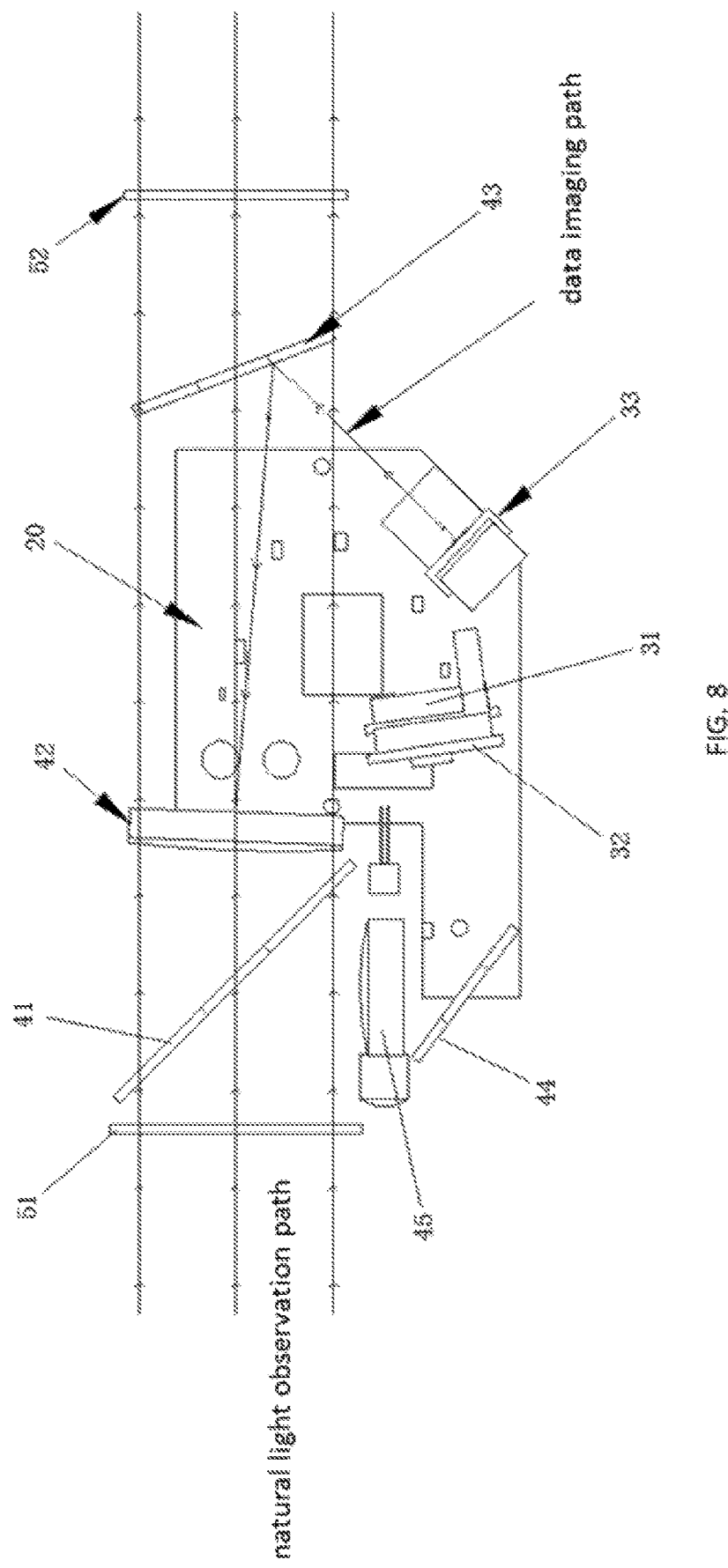
FIG. 8 is a schematic diagram showing a natural light observation optical path and a data imaging path of a ranging and sighting device having common optical path with laser separated in front of an imaging lens during use according to an embodiment of the present invention.
Figure 9:
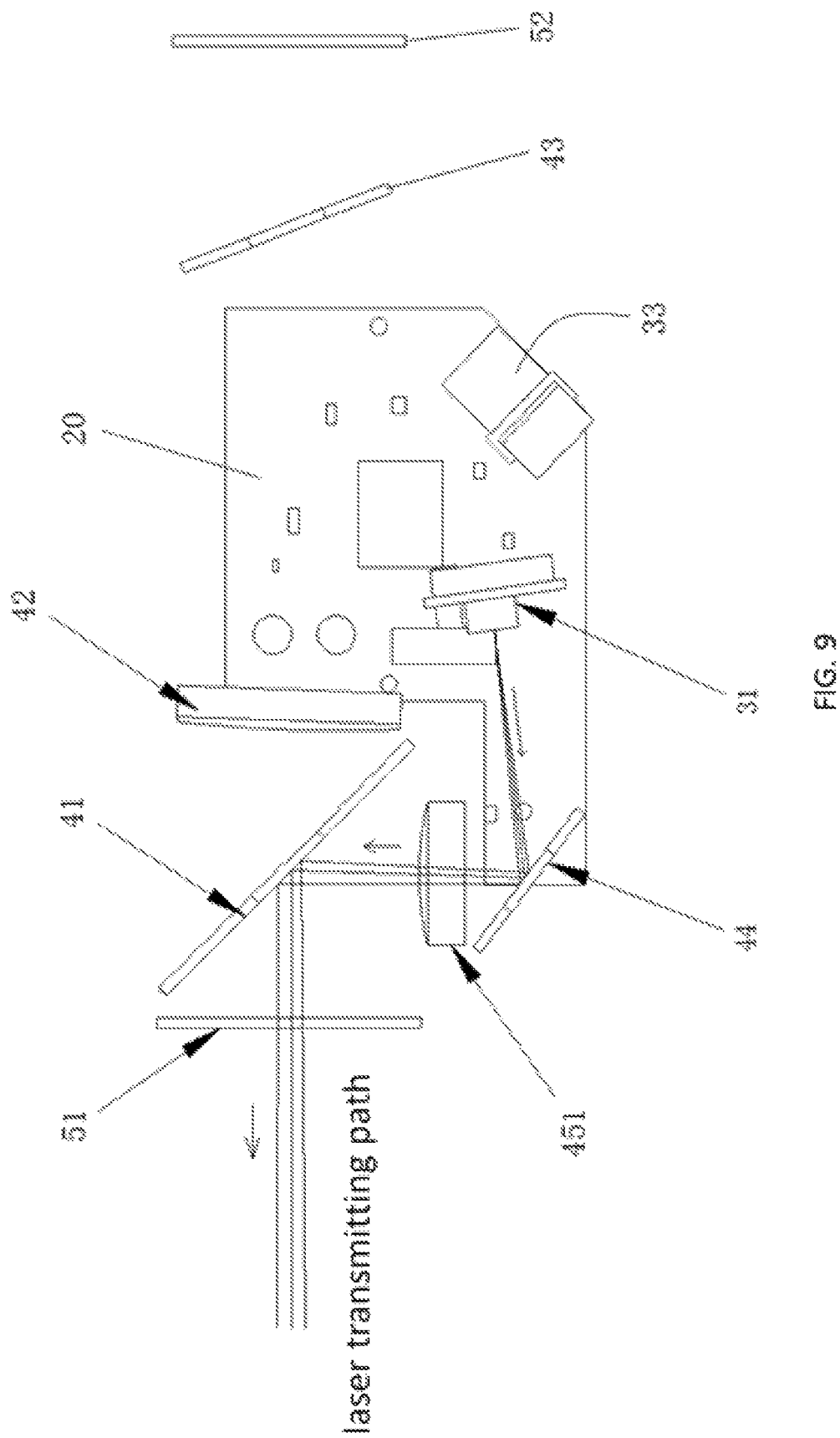
FIG. 9 is a schematic diagram showing a laser transmitting path of a ranging and, sighting device having common optical path with laser separated in front of an imaging lens during use according to an embodiment of the present invention.
Figure 10:
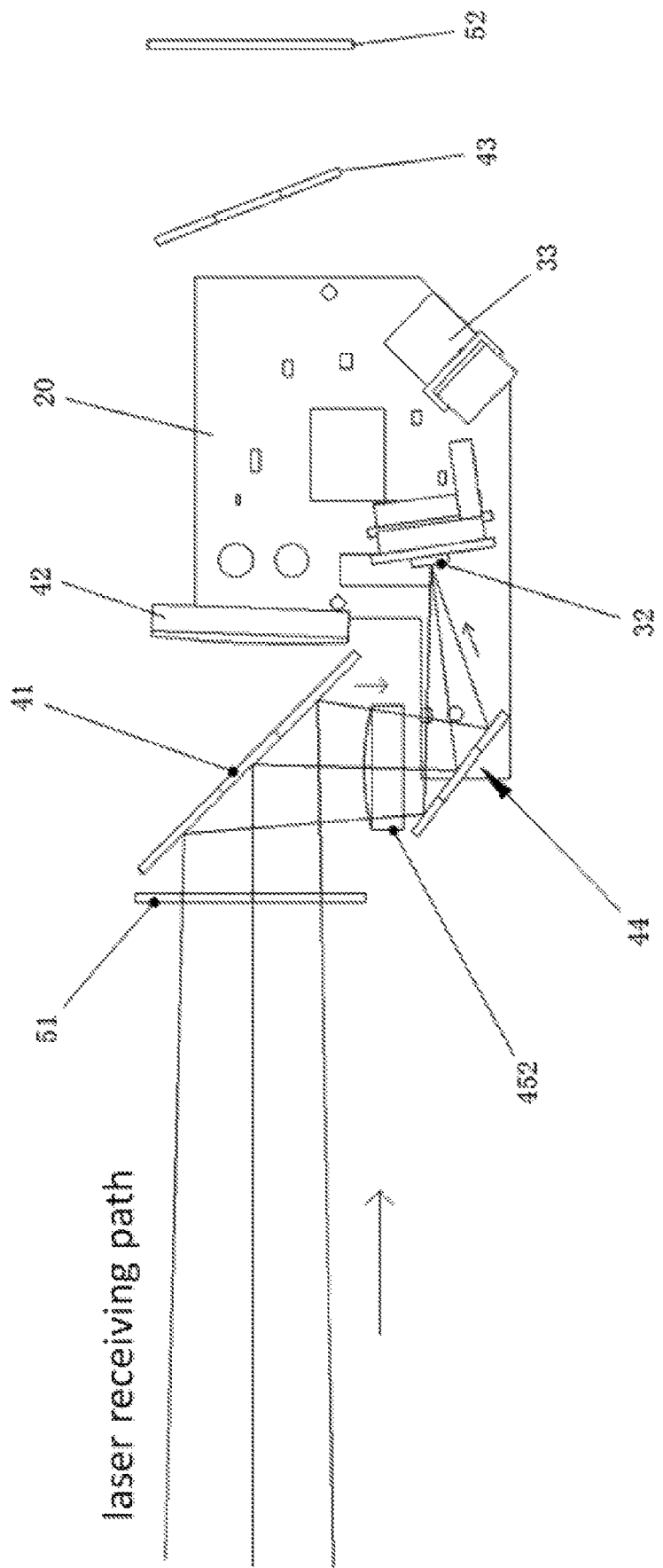
FIG. 10 is a schematic diagram of a laser receiving path of a ranging and sighting device having common optical path with laser separated in front of an imaging lens during use according to the embodiment of the present invention.

Particularly, the laser light transmitted from the laser transmitter 31 has a wavelength of 905 nm, and the red light transmitted from the data display 33 has a wavelength of 650 nm. As shown in FIG. 7 and FIG. 8, the natural light is transmitted through the first waterproof glass 51, the laser-reflection natural-light-transmission mirror 41, the concave imaging lens 42, the red-light-reflection natural-light-transmission mirror 43, and the second waterproof glass 52 to form a natural light observation path. After the ranging and sighting device having common optical path with laser separated in front of an imaging lens is activated, the red light with the wavelength of 650 nm transmitted from the data display 33 is reflected by the red-light-reflection natural-light-transmission minor 43 onto the concave imaging lens 42 for being imaged and displayed. As shown in FIG. 7 and FIG. 9, the laser light transmitted from the laser transmitter 31 to the laser reflecting mirror 44, and then is condensed by a laser-transmission condensing lens 451 to form parallel illumination laser light, which is then transmitted to the laser-reflection natural-light-transmission mirror 41 and is reflected there, to illuminate the object to be observed. Correspondingly, as shown in FIG. 7 and FIG. 10, the laser light reflected by the object to be observed is transmitted to the laser-reflection natural-light-transmission minor 41 and reflected there, and reflected laser light is condensed by a laser-reception condensing lens 452 and transmitted to the laser reflecting mirror 44 (that is, the laser condensing lens 45 includes the laser-transmission condensing lens 451 and the laser-reception condensing lens 452), thereby reflecting the laser light to the laser receiver 32 for being received. In the ranging and sighting device having common optical path with laser separated in front of an imaging lens, the above four optical paths are combined, and form optical paths of the ranging and sighting device having common optical path with laser separated in front of an imaging lens in operation.

In this embodiment, the laser-reflection natural-light-transmission mirror 41 separates the natural light from the laser light when original states of the natural light and the laser light have not yet changed. The separated natural light enters components (that is, the concave imaging lens 42, the red-light-reflection natural-light-transmission mirror 43 and the second waterproof glass 52) of an optical imaging system at the rear end. Transmitting and receiving energies of the laser light are maximized because of only passing through the reflecting path. Due to a coating characteristic of the laser-reflection natural-light-transmission mirror 41, the laser light may be sufficiently separated from the natural light, so that inclusions of the laser light in the optical instrument are minimized, thereby ensuring a safer optical use environment for the user.

The above is only preferred embodiments of the present invention, and is not intended to limit the present invention. Any modifications, equivalent substitutions and improvements made within the spirit and principles of the present invention should be included in the scope of protection of the present invention.

What is claimed is:

1. A ranging and sighting device having common optical path with laser separated in front of an imaging lens, comprising a housing, a control module, a laser transmitter, a laser receiver, a data display, a laser-reflection natural-light-transmission mirror, a concave imaging lens and a red-light-reflection natural-light-transmission mirror, wherein the housing is provided with an viewing hole and an observation hole; the housing defines a mounting cavity; the control module, the laser transmitter, the laser receiver, the data display, the laser-reflection natural-light-transmission mirror, the concave imaging lens and the red-light-reflection natural-light-transmission mirror are mounted within the mounting cavity; the viewing hole, the laser-reflection natural-light-transmission mirror, the concave imaging lens, the red-light-reflection natural-light-transmission mirror and the observation hole are linearly arranged in sequence to form a natural light observation path; the laser transmitter, the laser receiver and the data display are electrically connected with the control module; the data display emits red light for displaying; laser light transmitted from the laser transmitter illuminates an object to be observed after being reflected by the laser-reflection natural-light-transmission mirror; the laser light reflected by the object to be observed is received by the laser receiver after being reflected by the laser-reflection natural-light-transmission mirror; the red light transmitted from the data display is reflected by the red-light-reflection natural-light-transmission mirror and imaged on the concave imaging lens; a laser light path of the laser light transmitted from the laser transmitter after being reflected by the laser-reflection natural-light-transmission mirror is coaxial with the natural light observation path.

2. The ranging and sighting device having common optical path with laser separated in front of an imaging lens according to claim 1, further comprising a laser reflecting mirror mounted within the mounting cavity, wherein the laser reflecting mirror is arranged opposite to the laser-reflection natural-light-transmission mirror, the laser light transmitted from the laser transmitter illuminates the object to be observed after being reflected by the laser reflecting mirror and then the laser-reflection natural-light-transmission mirror, and the laser light reflected by the object to be observed is received by the laser receiver after being reflected by the laser-reflection natural-light-transmission mirror and then the laser reflecting mirror.

3. The ranging and sighting device having common optical path with laser separated in front of an imaging lens according to claim 2, further comprising a laser condensing lens mounted within the mounting cavity, wherein the laser condensing lens is arranged between the laser-reflection natural-light-transmission mirror and the laser reflecting mirror.

4. The ranging and sighting device having common optical path with laser separated in front of an imaging lens according to claim 1, wherein the concave imaging lens allows visible light to pass through, an inner concave surface of the concave imaging lens is capable of reflecting red light, and the concave imaging lens images the object to be observed by 1:1 after the natural light reflected by the object passes through the concave imaging lens along the natural light observation path.

5. The ranging and sighting device having common optical path with laser separated in front of an imaging lens according to claim 4, wherein the data display emits reference point red light, which is reflected by the red-light-reflection natural-light-transmission mirror and imaged as a reference red point at a center point of the concave imaging lens, and an observation axis of the natural light observation path passes through the reference red point.

6. The ranging and sighting device having common optical path with laser separated in front of an imaging lens according to claim 3, further comprising a built-in optical path mounting bracket mounted within the mounting cavity; wherein the laser transmitter, the laser receiver, the data display, the laser-reflection natural-light-transmission mirror, the concave imaging lens, the red-light-reflection natural-light-transmission mirror, the laser reflecting mirror and the laser condensing lens are fixedly mounted on the built-in optical path mounting bracket, wherein the laser transmitter, the laser reflecting mirror, the laser condensing lens and the laser-reflection natural-light-transmission mirror form an independent laser transmitting path within the built-in optical path mounting bracket; the laser-reflection natural-light-transmission mirror, the laser condensing lens, the laser reflecting mirror and the laser receiver form an independent laser receiving path within the built-in optical path mounting bracket; the data display, the red-light-reflection natural-light-transmission mirror and the concave imaging lens form an independent data imaging path within the built-in optical path mounting bracket; and the laser-reflection natural-light-transmission mirror, the concave imaging lens and the red-light-reflection natural-light-transmission mirror form an independent natural light observation path within the built-in optical path mounting bracket.

7. The ranging and sighting device having common optical path with laser separated in front of an imaging lens according to claim 6, wherein a first end of the built-in optical path mounting bracket is hinged on the housing, and a lifting adjustment mechanism is disposed between a second end of the built-in optical path mounting bracket and the housing.

8. The ranging and sighting device having common optical path with laser separated in front of an imaging lens according to claim 7, wherein the lifting adjustment mechanism comprises an adjusting worm, an adjusting worm wheel and a mating screw, the adjusting worm and the adjusting worm wheel are meshed with each other and both mounted on the housing, a first end of the mating screw is fixedly connected with the built-in optical path mounting bracket, and a second end of the mating screw is engaged with the adjusting worm wheel.

9. The ranging and sighting device having common optical path with laser separated in front of an imaging lens according to claim 8, wherein a limiting leaf spring is provided on the second end of the built-in optical path mounting bracket and pre-compressed between the second end of the built-in optical path mounting bracket and the housing, and the built-in optical path mounting bracket is arranged between the lifting adjustment mechanism and the limiting leaf spring.

10. The ranging and sighting device having common optical path with laser separated in front of an imaging lens according to claim 7, wherein a horizontally adjusting means is disposed between the second end of the built-in optical path mounting bracket and the housing.

11. The ranging and sighting device having common optical path with laser separated in front of an imaging lens according to claim 10, further comprising a first waterproof glass and a second waterproof glass, wherein the first waterproof glass is mounted on the viewing hole, and the second waterproof glass is mounted on the observation hole.

12. The ranging and sighting device having common optical path with laser separated in front of an imaging lens according to claim 11, wherein the housing is provided with a mounting groove in an outer side for being fitted with an assembling sliding rail of an external equipment.

* * * * *